(12) United States Patent
Fieselmann et al.

(10) Patent No.: US 12,705,747 B2
(45) Date of Patent: Aug. 11, 2026

(54) METHOD AND SYSTEM FOR DETERMINING THE BPE IN A CONTRAST MEDIUM-ENHANCED X-ray EXAMINATION OF A BREAST

(71) Applicant: Siemens Healthineers AG, Forchheim (DE)

(72) Inventors: Andreas Fieselmann, Erlangen (DE); Mathias Hoernig, Moehrendorf (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 411 days.

(21) Appl. No.: 18/466,285

(22) Filed: Sep. 13, 2023

(65) Prior Publication Data

US 2024/0087127 A1 Mar. 14, 2024

(30) Foreign Application Priority Data

Sep. 14, 2022 (EP) .................................... 22195622

(51) Int. Cl.
*G06T 7/00* (2017.01)
*G06V 10/764* (2022.01)

(52) U.S. Cl.
CPC .......... *G06T 7/0016* (2013.01); *G06V 10/764* (2022.01); *G06T 2207/10072* (2013.01);
(Continued)

(58) Field of Classification Search
CPC ......... G06T 7/0016; G06T 2207/10072; G06T 2207/10116; G06T 2207/30068;
(Continued)

(56) References Cited

U.S. PATENT DOCUMENTS

2017/0053403 A1* 2/2017 Fieselmann ........... G06T 7/0012
2020/0372637 A1* 11/2020 Ha ........................ G06T 7/0012
2021/0097677 A1 4/2021 Highnam et al.

FOREIGN PATENT DOCUMENTS

EP 3073924 A1 10/2016
WO WO-2022003656 A1 * 1/2022 ............. A61B 6/482

OTHER PUBLICATIONS

Wang, Jeff, et al. “Identifying triple-negative breast cancer using background parenchymal enhancement heterogeneity on dynamic contrast-enhanced MRI: a pilot radiomics study.” PloS one 10.11 (2015) (Year: 2015).*

(Continued)

*Primary Examiner* — Stephen R Koziol
*Assistant Examiner* — Dylan J Sherrillo
(74) *Attorney, Agent, or Firm* — Harness, Dickey & Pierce, P.L.C.

(57) ABSTRACT

One or more example embodiments of the present invention relates to a method for determining a Background Parenchymal Enhancement (BPE) in a contrast medium-enhanced X-ray examination of a breast comprising providing images of the X-ray examination, the images having been taken after administration of the contrast medium, the images comprising at least one low energy (LE) image taken at a predetermined low X-ray energy and a high energy (HE) image taken at a predetermined high X-ray energy, creating an iodine image from the LE image and the HE image and calculating a volumetric BPE as a sum of all pixel values in the iodine image for which the following two conditions apply i) iodine enrichment is present in the iodine image, and ii) fibroglandular tissue (FGT) is present. The method further includes obtaining BPE result data based on the iodine image and volumetric BPE and outputting the BPE result data.

20 Claims, 3 Drawing Sheets

(52) U.S. Cl.
CPC ............... *G06T 2207/10116* (2013.01); *G06T 2207/30068* (2013.01)

(58) Field of Classification Search
CPC ..................... G06T 7/0012; G06T 7/44; G06T 2207/20036; G06V 10/764; A61B 6/481; A61B 6/482; A61B 6/5217; A61B 6/502
See application file for complete search history.

(56) References Cited

OTHER PUBLICATIONS

Neeter, Lidewij MFH, et al. "Contrast-enhanced mammography: what the radiologist needs to know." BJR| Open 3.1 (2021) (Year: 2021).*
Wang, Jeff, et al. "Identifying triple-negative breast cancer using background parenchymal enhancement heterogeneity on dynamic contrast-enhanced MRI: a pilot radiomics study." PloS one 10.11 (Year: 2015).*
Neeter, Lidewij MFH, et al. "Contrast-enhanced mammography: what the radiologist needs to know." BJR| Open 3.1 (Year: 2021).*
Hannsun et al. (2021), "Contrast-Enhanced Mammography: Technique, Indications, and Review of Current Literature", Current Radiology Reports, vol. 9(12), https://doi.org/10.1007/s40134-021-00387-1.
Wei et al. (2021), Fully automatic quantification of fibroglandular tissue and background parenchymal enhancement with accurate implementation for axial and sagittal breast MRI protocols, Medical Physics, vol. 48(1), pp. 238-252.
Laidevant et al (2010), Compositional breast imaging using a dual-energy mammography protocol, Medical Physics, vol. 37(1), pp. 164-174, https://dx.doi.org/10.1118%2F1.3259715.
Wu et al. (2015), Quantitative assessment of background parenchymal enhancement in breast MRI predicts response to risk-reducing salpingo-oophorectomy: preliminary evaluation in a cohort of BRCA1/2 mutation carriers, Breast Cancer Research, vol. 17.
Michielsen et al (2020), Iodine quantification in limited angle tomography, Medical Physics., vol. 47(10), https://doi.org/10.1002/mp.14400.
Savaridas et al. (2017), Could parenchymal enhancement on contrast-enhanced spectral mammography (CESM) represent a new breast cancer risk factor? Correlation with known radiology risk factors, Clinical Radiology, vol. 72(12).
Sorin et al. (2020), Background Parenchymal Enhancement at Contrast-Enhanced Spectral Mammography (CESM) as a Breast Cancer Risk Factor, Academic Radiology, vol. 27(9), pp. 1234-1240.
Rella et al. (2018), Background parenchymal enhancement in breast magnetic resonance imaging: A review of current evidences and future trends, vol. 99(12), pp. 815-826.
Rella et al. (2020), Association between background parenchymal enhancement and tumor response in patients with breast cancer receiving neoadjuvant chemotherapy Diagnostic Intervential Imaging, vol. 101(10), pp. 649-655.
Ha et al. (2019), Fully automated convolutional neural network method for quantification of breast mri fibroglandular tissue and background parenchymal enhancement, J Digit Imaging, vol. 32(141), https://dx.doi.org/10.1007%2Fs10278-018-0114-7.
Berg W, et al.: Training Radiologists to Interpret Contrast-enhanced Mammography: Toward a Standardized Lexicon, Journal of Breast Imaging, vol. 3 (2), https://doi.org/10.1093/jbi/wbaa115.
Ekpo and McEntee (2014), Measurement of breast density with digital breast tomosynthesis—a systematic review, British Journal of Radiology, vol. 87(1043), https://dx.doi.org/10.1259%2Fbjr.20140460.
Saha et al. (2019), Machine learning-based prediction of future breast cancer using algorithmically measured background parenchymal enhancement on high-risk screening MRI, Journal of Magnetic Resonance Imaging, vol. 50(2), pp. 456-464.
American College of Radiology (2013), ACR BI-RADS® Atlas, Breast Imaging Reporting and Data System (5th ed.). Reston, VA, 2013 MRI section: https://www.acr.org/-/media/ACR/Files/RADS/BI-RADS/MRI-Reporting.pdf.
Gennaro et al. „Quantitative Breast Density in Contrast-Enhanced Mammography, J. Clin. Med. 2021, 10(15), 3309).
Borkowski et al. (2020), Fully automatic classification of breast MRI background parenchymal enhancement using a transfer learning approach, Medicine (Baltimore), vol. 17(99), pp. e21243, https://doi.org/10.1097/MD.0000000000021243.
Wang et al. (2010), Computerized Detection of Breast Tissue Asymmetry Depicted on Bilateral Mammograms: A Preliminary Study of Breast Risk Stratification, Academic Radiology, vol. 17(10), pp. 1234-1241.
Fieselmann et al. (2019), Volumetric breast density measurement for personalized screening: accuracy, reproducibility, consistency, and agreement with visual assessment, Journal of Medical Imaging, vol. 6(3) pp. 031406, https://dx.doi.org/10.1117/1.JMI.6.3.031406.
Malkow et al (2016), Mammographic texture and risk of breast cancer by tumor type and estrogen receptor status, Breast Cancer Research, vol. 18(122).
Nam et al. (2021), Fully Automatic Assessment of Background Parenchymal Enhancement on Breast MRI Using Machine-Learning Models, Journal of Magnetic Resonance Imaging, vol. 53(3). pp. 818-826, https://doi.org/10.1002/jmri.27429.

* cited by examiner 2
8
4
1
20
7
3
C
R
6
O
5
5.1
9
RD
SD
11
12
13
14
15
10

I
L
H
II
L
H
J
III
L
M
F
IV
J
F
ME
FE
V
J
FE
vB
VI
BE

METHOD AND SYSTEM FOR DETERMINING THE BPE IN A CONTRAST MEDIUM-ENHANCED X-ray EXAMINATION OF A BREAST

CROSS-REFERENCE TO RELATED APPLICATION(S)

The present application claims priority under 35 U.S.C. § 119 to European Patent Application No. 22195622.0, filed Sep. 14, 2022, the entire contents of which are incorporated herein by reference.

FIELD

One or more example embodiments of the present invention relates to a method and system for determining the BPE in a contrast medium-enhanced X-ray examination of a breast, as well as to a control facility suitable therefor and to a corresponding mammography system. One or more example embodiments of the present invention is particularly concerned with an automated assessment of BPE in the case of a contrast medium-enhanced dual-energy X-ray examination of the breast.

RELATED ART

Background enhancement (also often referred to as "Background Parenchymal Enhancement", which is why the abbreviation "BPE" is typically used here) is a common image feature in contrast medium-enhanced magnetic resonance tomography (ce-MRI) and contrast medium-enhanced 2D dual-energy mammography (also known as CEDEM for "Contrast-Enhanced Dual Energy Mammography).

BPE is considered a risk factor for breast cancer. Savaridas et al. ("Could parenchymal enhancement on contrast-enhanced spectral mammography (CESM) represent a new breast cancer risk factor? Correlation with known radiology risk factors", Clinical Radiology, vol. 72(12), 2017) note that classification of the level of BPE on CESM could be a useful addition to the tools for assessing breast cancer risk. Sorin et al ("Background Parenchymal Enhancement at Contrast-Enhanced Spectral Mammography (CESM) as a Breast Cancer Risk Factor", Academic Radiology, vol. 27(9), pp. 1234-1240, 2020) conclude that women with increased BPE had an increased risk of breast cancer, independent of other potential risk factors. Breast cancer risk in women with dense breasts could be better represented in combination with BPE on the CESM. The use of the level of BPE in CESM could therefore be valuable as an additional tool for assessing breast cancer risk and for beneficial surveillance.

Currently, BPE can only be assessed visually on CEDEM images, as there are no software-based methods for this.

When BPE is visually assessed by a physician, the results are highly dependent on that physician (inter- and intra-reader variability). Berget al. ("Training Radiologists to Interpret Contrast-enhanced Mammography: Toward a Standardized Lexicon", Journal of Breast Imaging, vol. 3 (2), 2021) indicate that radiologists show only moderate agreement for BPE (mean kappa=0.43; range 0.05-0.69). This variability reduces the potential utility of BPE as an imaging biomarker in the overall assessment of breast cancer risk. In addition, visual assessment of BPE requires resources (trained radiologists) which cannot always be available.

Automated methods for the assessment of BPE have been demonstrated for ce-MRI.

Ha et al. ("Fully automated convolutional neural network method for quantification of breast mri fibroglandular tissue and background parenchymal enhancement", J Digit Imaging, vol. 32(141), 2019) conducted a feasibility study to segment BPE volume using a Convolutional Neural Network (CNN) in ce-MRI data. No classification into BPE categories was performed.

Saha et al. ("Machine learning-based prediction of future breast cancer using algorithmically measured background parenchymal enhancement on high-risk screening MRI", Journal of Magnetic Resonance Imaging, vol. 50(2), pp. 456-464, 2019) have trained a machine learning model to quantify BPE from ce-MRI data.

Borkowski et al. ("Fully automatic classification of breast MRI background parenchymal enhancement using a transfer learning approach", Medicine (Baltimore), vol. 17(99), pp. e21243, 2020) have demonstrated a method for classifying BPE into one of the four categories of ce-MRI images using a CNN.

Wei et al. ("Fully automatic quantification of fibroglandular tissue and background parenchymal enhancement with accurate implementation for axial and sagittal breast MRI protocols", Medical Physics, vol. 48(1), pp. 238-252, 2021) have investigated a method that first segments fibroglandular tissue (FGT) in the Tl-weighted MRI image. This information is then used to measure the volumetric BPE in that volume of interest by a simple mathematical formula using the pre- and post-contrast images.

Nam et al. ("Fully Automatic Assessment of Background Parenchymal Enhancement on Breast MRI Using Machine-Learning Models", Journal of Magnetic Resonance Imaging, vol. 53(3). pp. 818-826, 2021) have applied a convolutional learning network (CNN) in order to segment FGT and BPE in order to classify BPE categories.

SUMMARY

No automated methods for assessing BPE have yet been presented for contrast medium-enhanced 2D mammography or contrast medium-enhanced 3D breast tomosynthesis.

One or more example embodiments of the present invention provides an improved method and a corresponding system for determining BPE in a contrast medium-enhanced X-ray examination of a breast, with which the disadvantages described above are avoided and, in particular, to assess BPE on contrast medium-enhanced mammography images, for example CEDEM images or CEDET images, since BPE can serve as a valuable biomarker in the overall assessment of breast cancer risk.

This is achieved by a method according to claim 1, a system according to claim 11, a control facility according to claim 12 as well as by a mammography system according to patent claim 13.

BRIEF DESCRIPTION OF THE DRAWINGS

One or more example embodiments of the present invention will be explained in more detail below with reference to the attached figures. In the various figures, identical components are provided with identical reference numerals. The figures are generally not to scale. In the drawings.

DETAILED DESCRIPTION

Figure 1:
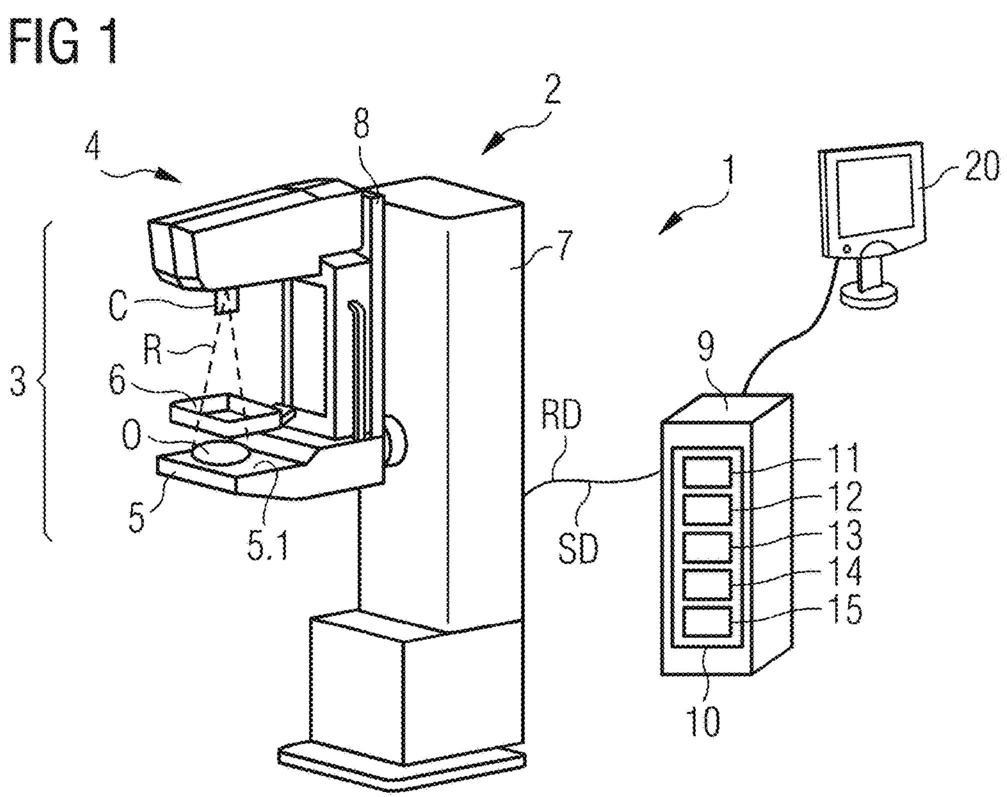
FIG. 1 shows a roughly schematic representation of a preferred mammography system with a preferred system according to one or more example embodiments.

The method in accordance with one or more example embodiments of the present invention for determining the BPE in a contrast medium-enhanced X-ray examination of a breast comprises the following steps:

providing images of the X-ray examination, said images having been taken after administration of a contrast medium, the images comprising at least one LE image which has been taken at a predetermined low X-ray energy and an HE image which has been taken at a predetermined high X-ray energy, creating a (preferably calibrated) iodine image from the LE image and the HE image, calculating a volumetric BPE as the sum of all pixel values in the iodine image for which the following conditions apply:

i) iodine enrichment is present in the iodine image, ii) fibroglandular tissue is present, obtaining BPE result data based on the iodine image and volumetric BPE, outputting the BPE result data.

In the case of a contrast medium-enhanced X-ray examination of a breast, at least two images are obtained according to the method: the LE image and the HE image. The X-ray examination is therefore a dual or multi-energy X-ray examination, in which images are taken at two or more different X-ray energies. Preferably, this is a CEDEM examination (see above "Contrast-Enhanced Dual Energy Mammography") or a CEDET examination ("Contrast-Enhanced Dual Energy Tomosynthesis"). A contrast medium is administered, especially intravenously, before the examination.

The LE image is typically taken as the first image at a low X-ray energy (LE: "low energy"). After a short time interval, but while the breast is still in the same compression phase as before, the HE image is then taken at a high X-ray energy (HE: "high energy"). Further images can well be taken at further energies, but the compression phase of the breast should not change. This results in (at least) the LE image and the HE image, which are preferably reconstructed in a spatial space if they do not already reflect spatial information (for example in a tomography). The two images are therefore multi- or dual-energy images at a higher energy (HE image) and a lower energy (LE image), Each of these images is formed from picture elements (pixels or voxels) that have at least one image value. In grayscale images, this image value is usually between 0 and 255, 1024 or a much higher natural number; in colored images, there can also be three image values per picture element, which represent the basic colors.

Each picture element is located at an individual image position (image coordinate). Corresponding picture elements correspond to the same point of the object. In images that have the same size and in which the object was mapped in an identical position, corresponding picture elements have the same image coordinate.

The iodine image is then created from the two images (in other words from the LE image and the HE image and possibly from further images of a multi-energy image). This is a synthetic image that is supposed to reflect the iodine concentration. The creation of the iodine image is known in the prior art and is often performed according to the formula:

$$\text{Iodine image}=\ln(\text{HE image})-w\cdot\ln(\text{LE image}),$$

with the natural logarithm ln and a predefined weighting factor w. The individual image values of the iodine image are calculated from the corresponding image values of the LE image and the HE image. Preferably, a calibrated iodine image is calculated, which is typically created in the prior art when calculating an iodine image.

Under ideal conditions (monochromatic X-ray source, no scattered radiation, etc.), there is a linear relationship between the signal intensity in a pixel in the iodine image and the iodine concentration in the cone-shaped area which is spanned by the X-ray source and the corresponding acquisition area of the detector (for example detector pixel). Under realistic conditions, this linear relationship is still a good approximation. There are multiple methods that aim to quantify the iodine concentration in a CEDEM image, such as the use of a compartmental model (see Laidevant et al (2010), "Compositional breast imaging using a dual-energy mammography protocol", Medical Physics, vol. 37(1), pp. 164-174). Quantification methods are also known for CEDET images (see Michielsen et al (2020), "Iodine quantification in limited angle tomography", Medical Physics., vol. 47(10)).

BPE refers to the image enhancement of fibroglandular tissue (FGT) after intravenous administration of a contrast medium. The term "fibroglandular tissue" is typically used for this tissue in German as well, and the abbreviation "FGT" is therefore used in the following to refer to the fibroglandular tissue. In a contrast medium-enhanced dual- or multi-energy X-ray examination, especially in an (iodine) contrast-enhanced X-ray examination, FGT is best visible in the LE image, while BPE can best be taken from the iodine image.

Thus, in order to calculate volumetric BPE (vBPE), it is easy to look across all picture elements of the iodine image to see if iodine accumulation is present along with FGT. In this respect, it is advantageous to work with masks that can also hold further information for additional evaluations.

The step of calculating the volumetric BPE can in particular comprise the following steps:

creating an FGT mask in which a classification is performed for each picture element in the LE image or a weighted linear combination of the LE image and a number of further spectral images as to whether it is fibroglandular tissue in the picture element or whether the picture element represents fibroglandular tissue, wherein in the positive case a corresponding image position in the FGT mask is marked with an FGT marker, creating an FGT-E mask in which a classification is performed at the image positions in the iodine image whose correspondences in the FGT map are marked with an FGT marker as to whether iodine enrichment is present there, wherein in the positive case a corresponding image position in the FGT-E mask is provided with an FGTE marker, calculating a volumetric BPE as the sum of all pixel values in the iodine image for which an FGTE marker is present at the corresponding position of the FGT-E mask.

Thus, in addition to the iodine image, an FGT mask is also calculated from the LE image. Basic principles for the automatic detection of FGT are known in the prior art. Since an LE-CEDEM image resembles a normal mammography (see for example Gennaro et al. "Quantitative Breast Density in Contrast-Enhanced Mammography", J. Clin. Med. 2021, 10(15), 3309), the method described by Fieselmann et al. (in "Volumetric breast density measurement for personalized screening: accuracy, reproducibility, consistency, and agreement with visual assessment", Journal of Medical Imaging, vol. 6(3) pp. 031406, 2019) can be used to create a breast density map. Methods for determining FGT from a tomosynthesis examination are also known (see for example Ekpo and McEntee, "Measurement of breast density with digital breast tomosynthesis-a systematic review", British Journal of Radiology, vol. 87(1043), 2014).

Preferably, the FGT mask is calculated from the detected FGT. For this purpose, it is decided (automatically) for each pixel in the LE image whether each pixel shows FGT or not. In practice, this can be performed, for example, by thresholding a breast density map with a predetermined threshold value. An appropriate threshold value is first determined and this is then applied to all pixels of the breast density map. If an image value is above the threshold, an FGT marker is set in the FGT mask at the corresponding position, for example "1", indicating that FGT is present there. Otherwise, no value or another value, for example "0", is set. The FGT marker can have any shape or value, as long as it can be used as a marker for FGT in the LE image. For example, the FGT mask can be an image that has the same image format as the LE image and has FGT markers at the image coordinates where FGT is present in the LE image.

If the iodine image and FGT mask are available, the FGT-E mask can be created. For this purpose, the FGT mask is used (in other words only where fibroglandular tissue is present, in other words an FGT marker is present) to look at the same position in the iodine image to see whether iodine enrichment is present at this position. For this purpose, for example the image value of a corresponding pixel can be compared with a predetermined threshold value and in the case in which the image value is greater than the threshold value, an iodine enrichment is assumed. This is then carried out for all pixels of the FGT mask that display FGT (for example that have the value "1"). If the iodine image is calibrated, the threshold value can be a specific value (for example depending on the breast thickness). However, the threshold value can also be determined based on the signal histogram of the iodine image (for example a value relative to the range 5%-95% fraction of intensities). For example, the FGT-E mask can be an image that has the same image format as the iodine image and has FGTE markers at the image coordinates where FGT is present in the LE image (FGT markers) and has iodine enhancement in the iodine image.

The classification is preferably binary, so that the image position in the FGT-E mask at which iodine enrichment is present in the iodine image is provided with an FGTE marker, for example with the value 1. The remaining areas of the FGT-E mask can have values which indicate that there is no iodine enrichment present or that the FGT mask shows no FGT there, for example the value "0". The term "FGTE marker" is used to distinguish this marker from the FGT marker of the FGT mask. The classification of the FGT map is also preferably binary.

The FGT map and/or the FGT-E map can be in the form of images that are preferably the same size or format as the LE images and/or the iodine image. A comparison pixel by pixel of corresponding spatial positions is then particularly easy to realize. Preferably, each pixel of the iodine image corresponds to a pixel of the respective LE image and HE image. Then it is particularly advantageous if each pixel of the FGT mask (occupied by an FGT marker or no marker) corresponds to a pixel of the LE image (and thus also of the iodine image) (with corresponding values for classification) and each pixel of the FGT-E mask corresponds to a pixel of the iodine image (with corresponding FGTE markers for classification).

If the FGT-E mask is available, then the volumetric BPE ("vBPE") can be calculated using this FGT-E mask and the iodine image. In this case, the sum of all pixel values in the iodine image for which an FGTE marker is present at the corresponding position of the FGT-E mask is calculated. It is preferred in this case to normalize this sum S to the volume, in other words to basically calculate a BPE density S as vBPE, so that for example the volumetric BPE per cubic centimeter or per milliliter is available. This makes it easy to compare breasts of different sizes or to indicate comparable BPE thresholds. Volumetric BPE has advantages over BPE which is determined over an area in that it more accurately indicates breast cancer risk.

The unit of vBPE is preferably the same as that used for the iodine image. If the iodine image is calibrated, a preferred unit is "mg iodine/ml". If the iodine image is not calibrated, the uncalibrated vBPE* can be determined. The values vBPE and vBPE* can certainly be used to calculate further metrics. In the following, volumetric BPE (vBPE) includes both cases.

It is then possible to obtain BPE result data based on the iodine image and the volumetric BPE. These can basically already be the volumetric BPE. However, the aforementioned BPE density can also be calculated as BPE result data (if the vBPE does not yet represent a density). The BPE result data can also contain a BPE image that represents the image values of the iodine map at the positions of the FGTE markers of the FGT-E map.

It should be noted that usually the concentration of BPE is divided into four categories: "minimal", "light", "moderate" and "pronounced". Although this categorization can be performed using a percentage of area in the BPE image, it is advantageous to consider both volume and intensity or the distribution and morphology. This categorization can also be performed based on the volumetric BPE and iodine map or using the BPE image and can be included in the BPE result data.

This BPE result data is then output, for example on a screen, so that a user can view it. However, the data can also simply be stored until a medical professional can deal with it.

A system in accordance with one or more example embodiments of the present invention for determining the BPE in a contrast medium-enhanced X-ray examination of a breast in accordance with a method according to one of the preceding claims comprises the following components:

- a data interface designed to receive images of the X-ray examination, said images having been taken after administration of a contrast medium, the images comprising at least one LE image which has been taken at a predetermined low X-ray energy and an HE image which has been taken at a predetermined high X-ray energy,
- an iodine image unit designed to create an iodine image from the LE image and the HE image,
- a BPE unit designed to calculate a volumetric BPE as the sum of all pixel values in the iodine image (J) for which the following conditions apply:

i) iodine enrichment is present in the iodine image, ii) fibroglandular tissue is present, and designed to obtain BPE result data based on the iodine image and volumetric BPE, a data interface designed to output the BPE result data.

For advantageous calculation of the vBPE, the system, in particular its BPE unit, can comprise the following units:

an FGT unit designed to create an FGT mask in which a classification is performed for each picture element in the LE image or a weighted linear combination of the LE image and a number of further spectral images as to whether the picture element represents fibroglandular tissue or whether it is fibroglandular tissue in the picture element, wherein in the positive case a corresponding image position in the FGT mask is marked with an FGT marker, an FGTE unit designed to create an FGT-E mask in which a classification is performed at the image positions in the iodine image whose correspondences in the FGT map are marked with an FGT marker as to whether an iodine enrichment is present there, wherein in the positive case a corresponding image position in the FGT-E mask is provided with an FGTE marker.

wherein the BPE unit is designed to calculate the volumetric BPE as the sum of all pixel values in the iodine image at which an FGTE marker is present at the corresponding position of the FGT-E mask.

The components work according to the steps of the method described above. Thus, a reader-independent automated assessment of BPE can be provided.

A control facility in accordance with one or more example embodiments of the present invention is designed to control a mammography system. Such control facilities are basically known in the prior art. However, a control facility in accordance with one or more example embodiments of the present invention comprises a system in accordance with one or more example embodiments of the present invention.

A mammography system in accordance with one or more example embodiments of the present invention comprises a control facility in accordance with one or more example embodiments of the present invention.

In particular, one or more example embodiments of the present invention can be realized in the form of a computer unit, especially in a control facility for a mammography system, with suitable software. The computer unit can, for example, have one or more cooperating microprocessors or the like for this purpose. In particular, it can be realized in the form of suitable software program parts in the computer unit. A largely software-based realization has the advantage that computer units already in use can be retrofitted in a simple manner by a software or firmware update in order to function in the manner in accordance with one or more example embodiments of the present invention. In this respect, the object is also achieved by a corresponding computer program product having a computer program which can be loaded directly into a memory facility of a computer unit, having program sections in order to execute all steps of the method in accordance with one or more example embodiments of the present invention when the program is executed in the computer unit. In addition to the computer program, such a computer program product can optionally comprise additional components, such as documentation and/or additional components, including hardware components, such as hardware keys (dongles, etc.) for using the software. For the transport to the computer unit and/or for storage on or in the computer unit, it is possible to use a computer-readable medium, for example a memory stick, a hard drive or another transportable or fixedly installed data carrier, on which the program steps of the computer program that can be read and executed by the computer system are stored.

Further, particularly advantageous embodiments and developments of the invention are disclosed in the dependent claims and the description below, wherein the claims of one claim category can also be developed in a similar manner to the claims and description parts to another claim category and in particular also individual features of different exemplary embodiments or variants can be combined to form new exemplary embodiments or variants.

A preferred method comprises the following additional steps:

counting the number of FGT markers of the FGT mask (in other words the number of pixels of the LE image where FGT is present) as X and the number of FGTE markers of the FGT-E mask (in other words the number of pixels where FGT is present in the LE image and additionally iodine enhancement is present in the iodine image) as XE, —calculating the relative BPE ("rBPE") with the quotient rBPE=XE/X.

The rBPE is the iodine-enriching relative percentage of the FGT. The calculation can be useful as a relative measure and as additional information for a radiologist.

In practice, one or more example embodiments of the present invention unfolds a great benefit when, in addition to performing an automated determination of the BPE volume, it also performs an automated classification of BPE in the iodine image.

In accordance with a preferred method, therefore, an automated classification of BPE result data in the iodine image is additionally performed. Preferably, a location-dependent classification is determined for this purpose by applying an assignment function to picture elements of the iodine image, in particular an assignment function that assigns specific designations to intervals of a continuous value range. Here, four designations which indicate four different degrees of strength are preferred, for example into the categories "minimal", "slight", "moderate" and "pronounced". However, a different range of values can also be selected.

In comparison to volumetric BPE, which as a continuous variable allows a good description of BPE (for example which can be included in tools for assessing breast cancer risk), said classification of BPE is often advantageous in clinical practice. Classification of BPE, especially from CEDEM/T examination data, can advantageously be performed based on the relative BPE (rBPE) and/or the volumetric BPE (vBPE), wherein discrete categories are assigned to continuous values, for example by checking whether the value lies in a value interval which represents a classification. The value intervals can be obtained by calibration with labels from radiologists on a data set of CEDEM/T images for which the vBPE values or rBPE values have been calculated.

It is also advantageous if the results are displayed graphically, especially to facilitate interpretation by a medical professional. In particular, such a display should take place in the form of a combination of the results per view and per breast in order to optimally integrate the BPE assessment into the clinical workflow.

In accordance with a preferred method, a graphical display of the iodine image or an image derived from the iodine image is output as part of the output of the BPE result data. Alternatively or additionally, the volumetric BPE and/or a value rBPE is preferably displayed, and particularly preferably a combination of results by view and by breast is displayed.

In practice, it is advantageous to have a value per patient at the end, for example 4 images, two of each breast, and by combination (for example averaging) at the end a value, for example a maximum value, is available for the BPE. Classification results can also be visualized together with information on how close the category is to a neighboring category. The BPE result data can also include differences in BPE values, especially vBPE or rBPE, wherein the differences are preferably of a temporal nature (before/after treatment) or differences in the assessment between the two breasts (asymmetries).

In accordance with a preferred method, in order to create the FGT mask, a breast density map is first created or provided and the FGT mask is created by thresholding the breast density map with a predetermined threshold value.

It is known that BPE and mammographic breast density (reflected by the FGT) are highly correlated. A mismatch of the BPE and breast density pattern in the image could be an indicator of a relevant clinical condition.

In accordance with a preferred method, automated detection of the deviation between a local mammographic breast density and the BPE result data is performed based on the LE image and the iodine image. If the pattern of BPE and breast density do not match, an indicator of a relevant clinical condition is generated.

The following steps can be used to advantageously identify a discrepancy between BPE and breast density:

- calculating a breast density map from the LE image or a linear combination of LE and HE images (or other spectral images for example from a triple energy acquisition), for example using a method described by Fieselmann et al. ("Volumetric breast density measurement for personalized screening: accuracy, reproducibility, consistency, and agreement with visual assessment", Journal of Medical Imaging, vol. (3) pp. 031406, 2019),
- comparing the intensity values of the picture elements (pixels or voxels) of the breast density map with the corresponding picture elements in the iodine image, wherein the compared image area is preferably predetermined by the FGT mask and/or the FGT-E mask (or is restricted by these), with formation of a number of deviation values, wherein mean deviation values are calculated in predetermined sub-areas, in particular individual pixels or pixel groups, for example square ROIs (side lengths around 3 cm are advantageous),
- determining whether the deviation values lie locally or globally outside a predefined range of values, in particular by applying a correlation analysis.

A local mismatch is detected if the two mean values of the results of the two breasts deviate from the global behavior for example determined by applying a correlation analysis of the whole images. The amount of mismatched ROIs can be quantified (for example relative amount of mismatched ROIs).

BPE can be analyzed quantitatively in different ways. An advantageous analysis concerns a global characterization (spatial distribution), or more precisely: whether the BPE is localized or homogeneously distributed in the image.

In accordance with a preferred method, an automated analysis of the spatial distribution, morphology and texture of BPE in the iodine image is performed. A possible quantification approach can be based on the sequential application of morphological operators, as described in EP 3073924 A1 for the quantification of the masking risk of FGT in mammograms. It is preferred that, in deviation from this method, the method is applied to the FGT-E mask and/or the iodine image and not to the breast density map. Thus, it is preferable to determine whether the BPE is localized or homogeneously distributed in the iodine image, in particular wherein morphological operators are applied sequentially to the iodine image or to the FGT-E mask.

Another advantageous analysis concerns a local characterization, in other words how the BPE appear at the local level (morphology and texture). Numerous methods for analyzing local appearance are known in the literature, for example using Haralick texture functions. These methods are applied to the FGT-E mask and/or the iodine image. Thus, the morphology and texture of the BPE is also preferably determined, in particular using Haralick texture functions which are applied to the FGT-E mask and/or the iodine image. In particular, quantitative imaging biomarkers are extracted from the iodine image, the FGT-E mask, the LE image, the HE image and/or images or masks derived therefrom.

By using global and/or local characterization, quantitative imaging biomarkers can be extracted from the CEDEM/T examination data. These biomarkers can be used to predict individual patient characteristics, such as response to breast cancer treatment.

From studies based on ce-MRI, it is known that BPE changes during neoadjuvant chemotherapy (NAC) can be an imaging biomarker for the response to treatment. An early reduction of BPE in the contralateral breast during NAC can be an early predictor of loss of tumor response. Thus, this reduction in BPE can be used as a biomarker of response to treatment, particularly in women with stage 3 or 4 breast cancer and HER2-negative breast cancer (see Rella et al. (2020), Association between background parenchymal enhancement and tumor response in patients with breast cancer receiving neoadjuvant chemotherapy, Diagnostic and Interventional Imaging, vol. 101(10), pp. 649-655).

In addition to ce-MRI, or when ce-MRI is not available, BPE change over time can be determined using CEDEM/T examinations in order to predict the response to treatment or monitor treatment success.

As a quantitative imaging biomarker, the relative change in vBPE can be calculated. Similarly, a change in the spatial distribution, morphology and texture of BPE between points in time could be quantified based on the numerical values of features which describe these characteristics.

In accordance with a preferred method, an automated longitudinal section assessment of BPE is performed based on the iodine image. It is preferred that the method is performed on LE images and HE images from multiple X-ray examinations of the same individual and the relative change in volumetric BPE across the different X-ray examinations is calculated and or a change in spatial distribution, morphology and/or texture of BPE is calculated.

Attention should be paid to significant differences in the BPE pattern in the left and right breast. For BPE assessment from CEDEM/T examination data, it is beneficial to quantify and take into consideration any asymmetry. Wang et al ("Computerized Detection of Breast Tissue Asymmetry Depicted on Bilateral Mammograms: A Preliminary Study of Breast Risk Stratification", Academic Radiology, vol. 17(10), pp. 1234-1241, 2010) describe a method for quantifying asymmetry in X-ray examinations of the breast, said method could also be applied to the iodine image, for example.

In accordance with a preferred method, based on LE images and HE images of a bilateral mammographic examination (imaging of both breasts), an automated assessment of symmetry is performed based on the iodine image of an imaged right breast and an imaged left breast.

In accordance with a preferred method, the X-ray examination was performed via a spectral multi-energy imaging technique (for example, triple energy), including a preferred use of multi-slice detectors for image acquisition. The iodine image and/or the FGT-E mask and/or in particular the FGT mask is thereby preferably generated via at least one further image which has been taken at a different energy than the LE image and the HE image.

The proposed assessment steps can also be performed in individual or combined images.

In a further alternative embodiment, the proposed method can be applied to contrast medium-enhanced breast CT as a further X-ray imaging and full 3D acquisition method.

FIG. 1 shows by way of example and roughly schematically a mammography system 1 in the form of a tomosynthesis system 1. Relative directions such as "up", "down" etc. refer to a tomosynthesis system 1 set up for operation as intended. The tomosynthesis system 1 comprises a tomosynthesis device 2 and a control facility 9.

The tomosynthesis device 2 has a stand column 7 and a source-detector arrangement 3, which in turn comprise an X-ray source 4 and a detector 5 having a detector surface 5.1. The stand column 7 stands on the ground during operation. The source-detector arrangement 3 is movably connected to it so that the height of the detector surface 5.1, in other words the distance to the ground, can be adjusted to the breast height of a patient. The tomosynthesis system 1 is designed here as an example for CEDEM or CEDET images and can measure with two X-ray energies, so that an LE image and an HE image can be taken.

A breast O of the patient (shown here schematically) lies on top of the detector surface 5.1 as examination object O for an examination. A plate 6 is arranged above the breast O and the detector surface 5.1, said plate being slidably connected to the source-detector arrangement 3. For the examination, the breast O is compressed and at the same time fixed by lowering the plate 6 onto it so that pressure is exerted on the breast O between the plate 6 and the detector surface 5.1.

The X-ray emitter 4 is arranged and designed opposite the detector 5 in such a manner that the detector 5 detects X-ray radiation R emitted by it after at least part of the X-ray radiation R has penetrated the breast O of the patient. In this case, the X-ray emitter 4 can be pivoted relative to the detector 5 via a rotary arm 8 in a range of ±50° about a basic position in which it is perpendicular above the detector surface 5.1. The section to be recorded can be specified or restricted via a collimator C, which can also contain filters C.

The control facility 9 receives the raw data RD of the measurement and sends control data SD to the tomosynthesis device 2 via a data interface. It is connected to a terminal 20 via which a user can communicate commands to the tomosynthesis system 1 or retrieve measurement results. The control facility 9 can be located in the same room as the tomosynthesis device 2, but it can also be located in an adjacent control room or at an even further spatial distance.

The system 10 in accordance with one or more example embodiments of the present invention for determining the BPE in a contrast medium-enhanced X-ray examination of a breast (O) is in this case part of the control facility 9 and comprises the following components (see also in this regard the method according to FIG. 2):

A data interface 11 designed to receive images L, H of the X-ray examination, said images having been taken after administration of a contrast medium, the images comprising at least one LE image L which has been taken at a predetermined low X-ray energy and an HE image H which has been taken at a predetermined high X-ray energy.

An iodine image unit 12 designed to create an iodine image J from the LE image L and the HE image H, for example via the formula: $\text{PixelIodine}=\ln(\text{PixelHE})-w\cdot\ln(\text{PixelLE})$ with the weighting factor w and the natural logarithm ln( ) for all pixels of the iodine image.

An FGT unit 13 designed to create an FGT mask F in which a classification is performed for each picture element in the LE image L or a weighted linear combination of the LE image and a number of further spectral images as to whether the picture element represents fibroglandular tissue, wherein in the positive case a corresponding image position in the FGT mask F is marked with an FGT marker, An FGTE unit 14 designed to create an FGT-E mask FE in which a classification is performed at the image positions in the iodine image J whose correspondences in the FGT map F are marked with an FGT marker M as to whether an iodine enrichment is present there, wherein in the positive case a corresponding image position in the FGT-E mask FE is provided with an FGTE marker ME.

A BPE unit 15 designed to calculate the volumetric BPE as the sum of all pixel values in the iodine image J at which an FGTE marker ME is present at the corresponding position of the FGT-E mask FE, and designed to determine BPE result data BE based on the iodine image J and the volumetric BPE.

In this example, the data interface 11 is also designed to output the BPE result data BE.

Figure 2:
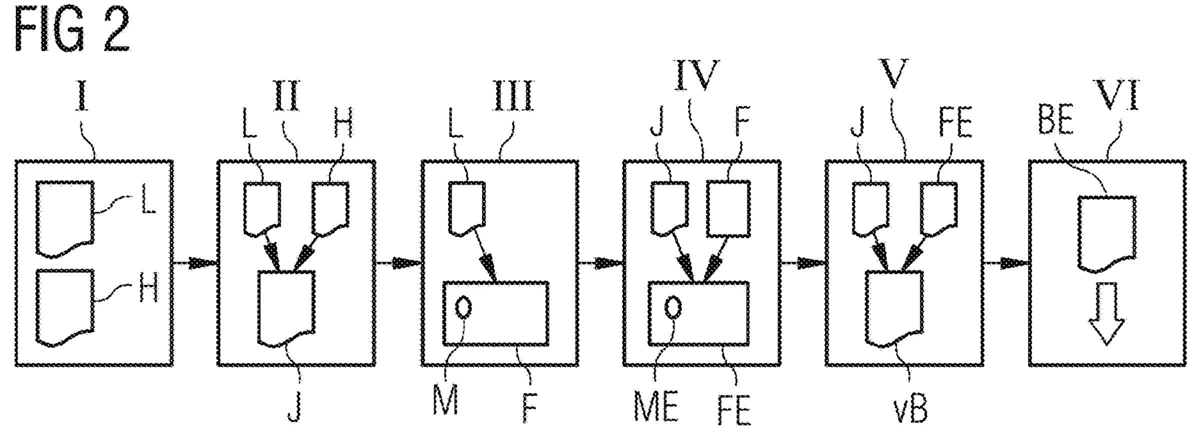
FIG. 2 shows a flow chart for a possible sequence of a method in accordance with one or more example embodiments.

FIG. 2 shows a block diagram which exemplifies the sequence of a method in accordance with one or more example embodiments of the present invention for determining the BPE in a contrast-enhanced X-ray examination of a breast.

In step I, images L, H of the X-ray examination are provided, said images having been taken after administration of a contrast medium, the images comprising at least one LE image L which has been taken at a predetermined low X-ray energy and an HE image H which has been taken at a predetermined high X-ray energy.

In step II, an iodine image J is created from the LE image L and the HE image H, for example using the formula: $\text{PixelIodine}=\ln(\text{PixelHE})-w\cdot\ln(\text{PixelLE})$ with the weighting factor w and the natural logarithm ln( ) for all pixels of the iodine image.

In step III, an FGT mask F is created in which a classification is performed for each picture element in the LE image L as to whether the picture element represents fibroglandular tissue, wherein in the positive case a corresponding image position in the FGT mask F is marked with an FGT marker M.

In step IV, an FGT-E mask FE is created in which at the image positions in the iodine image J whose correspondences in the FGT map F are marked with an FGT marker M, a classification is performed as to whether an iodine enrichment is present there, wherein in the positive case a corresponding image position of the FGT-E mask FE is provided with an FGTE marker ME.

In step V, the volumetric BPE is calculated. In this case, the vBPE is the sum of all pixel values in the iodine image J for which an FGTE marker ME is present at the corresponding position in the FGT-E mask FE, normalized to a volume.

In step VI, BPE result data BE is obtained as a categorization of volumetric BPE and an image representation based on the iodine map J and the FGT-E mask FE, and this BPE result data BE is output.

Figure 3:
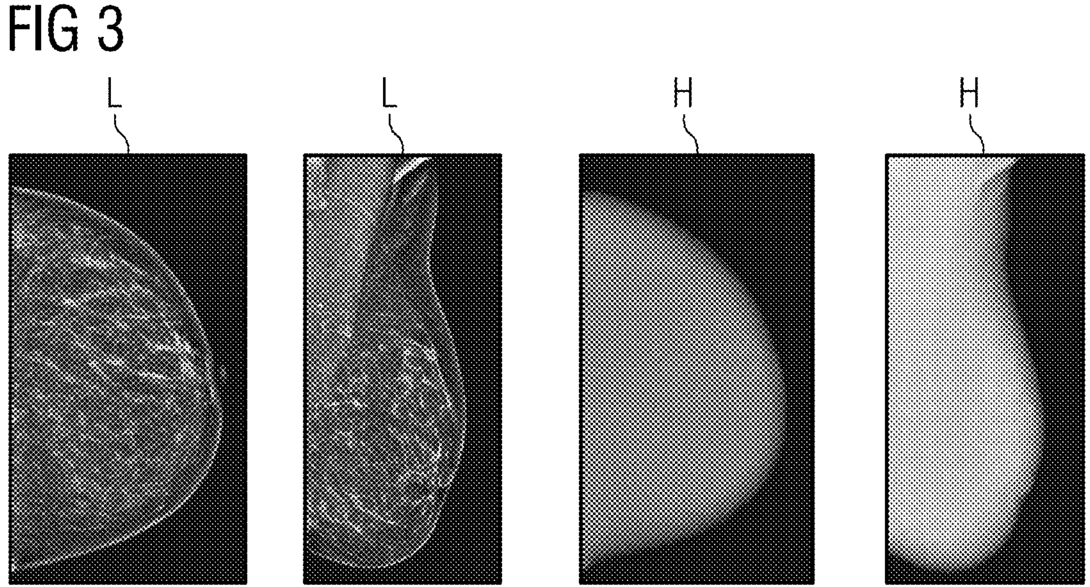
FIG. 3 shows an example of LE images and HE images which have been taken in accordance with one or more example embodiments.

FIG. 3 shows an example of LE images L and HE images H of a breast which have been taken from above and from the side. This data serves as a basis for a method in accordance with one or more example embodiments of the present invention. The first and third images show the breast from above, the second and fourth images show the breast from the side.

Figure 4:
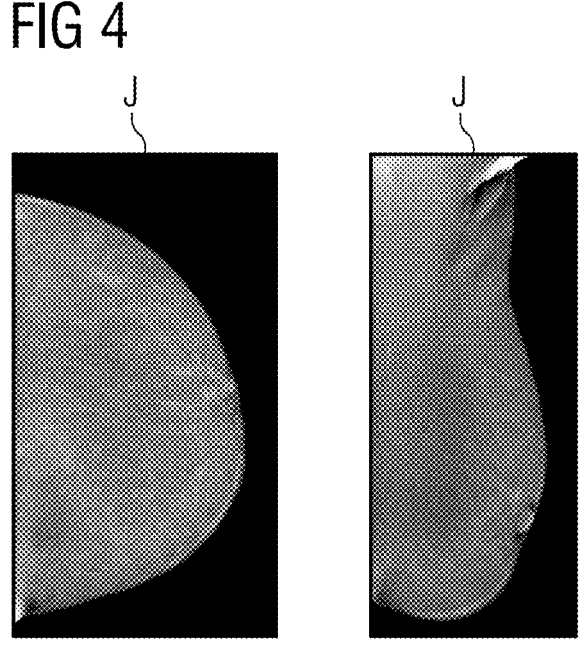
FIG. 4 shows an example of iodine images.

FIG. 4 shows an example of iodine images J of a breast based on the LE images L and HE images H of FIG. 3. They were created using the function iodine image=ln(HE image)−w−ln(LE image) which is explained above in more detail. On the left, the figure shows the iodine image J of the breast taken from above, on the right a side view.

Figure 5:
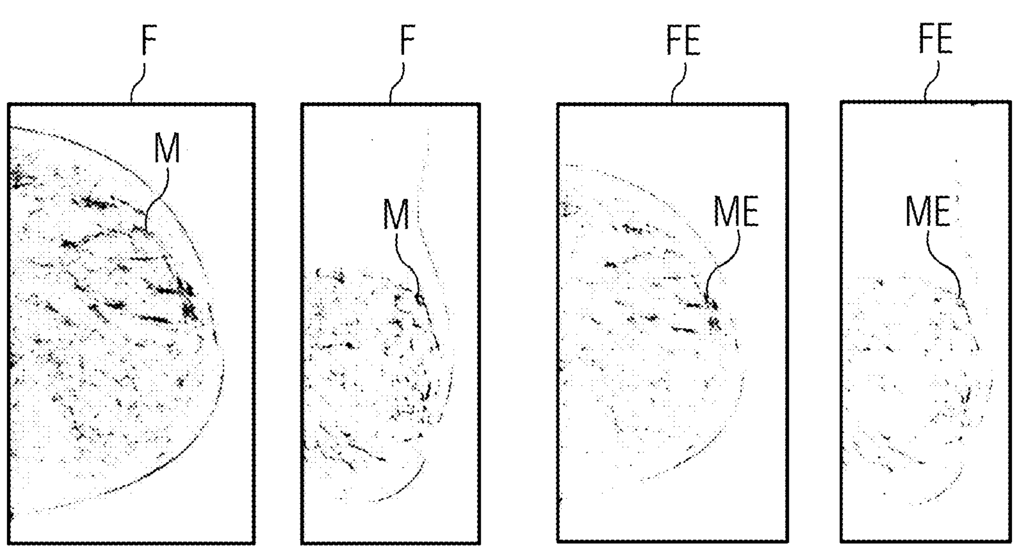
FIG. 5 shows an example of FGT masks and FGT-E masks.

FIG. 5 shows an example of FGT masks F and FGT-E masks FE. The first and third images show the breast from above, the second and fourth images show the breast from the side. Black spots represent markers M, ME. The FGT markers M in the FGT masks F are more extensive than the FGTE markers ME in the FGT-E masks FE, since for the latter only the entries of the FGT mask F are used, wherein in the iodine images the image values (representing the iodine content) had to be above a given threshold.

Finally, it is pointed out once again that the methods described in detail above and the illustrated system are merely exemplary embodiments which can be modified by the person skilled in the art in a wide variety of ways without leaving the scope of the invention. Furthermore, the use of the indefinite article "a" or "an" does not exclude that the relevant features can also be present in a plurality. Likewise, terms such as "unit" do not exclude that the relevant components consist of multiple interacting partial components which can where appropriate also be distributed in a spatial manner. The term "a number" is to be read as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, Cif, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

We claim:

1. A method for determining a Background Parenchymal Enhancement (BPE) in a contrast medium-enhanced X-ray examination of a breast comprising:

providing images of the contrast medium-enhanced X-ray examination, the images having been taken after administration of a contrast medium, the images comprising at least one low energy (LE) image taken at a predetermined low X-ray energy and a high energy (HE) image taken at a predetermined high X-ray energy;

creating an iodine image from the at least one LE image and the HE image;

calculating a volumetric BPE as a sum of all pixel values in the iodine image for which iodine enrichment is present in the iodine image and fibroglandular tissue (FGT) is present;

obtaining BPE result data based on the iodine image and the volumetric BPE; and outputting the BPE result data.

2. The method of claim 1, wherein the calculating includes:

creating an FGT mask in which a classification is performed for each picture element in the at least one LE image or a weighted linear combination of the at least one LE image and a number of further spectral images as to whether a picture element represents FGT, a corresponding image position in the FGT mask is marked with an FGT marker for each picture element that represents FGT;

creating an FGT enrichment (FGT-E) mask, in which a classification is performed at image positions in the iodine image whose correspondences in the FGT mask are marked with an FGT marker as to whether iodine enrichment is present, wherein in a positive case a corresponding image position in the FGT-E mask is provided with an FGTE marker for the image positions in the iodine image that are classified with iodine enrichment being present; and calculating the volumetric BPE as the sum of all pixel values in the iodine image for which an FGTE marker is present at the corresponding image position of the FGT-E mask.

3. The method of claim 2, further comprising:

counting a number of FGT markers of the FGT mask as X and a number of FGTE markers of the FGT-E mask as XE; and calculating a relative BPE rBPE as rBPE=XE/X.

4. The method of claim 1, further comprising:

classifying BPE result data in the iodine image by applying an assignment function to image elements of the iodine image.

5. The method of claim 1, wherein the outputting includes at least one of:

graphically displaying the iodine image or of an image derived from the iodine image, or displaying at least one of the volumetric BPE or a value rBPE is performed.

6. The method of claim 1, further comprising:

detecting a deviation between a local mammographic breast density and the BPE result data based on the at least one LE image and the iodine image, wherein if a pattern of the BPE and the local mammographic breast density do not match, an indicator of a relevant clinical condition is generated.

7. The method of claim 1, further comprising:

performing an automated analysis of a spatial distribution, a morphology and a texture of the BPE in the iodine image.

8. The method of claim 1, further comprising:

performing an automated longitudinal section assessment of the BPE based on the iodine image using LE images and HE images from multiple X-ray examinations of a same individual.

9. The method of claim 1, wherein based on LE images and HE images of a bilateral mammographic examination, an automated assessment of symmetry is performed based on the iodine image of an imaged right breast and an imaged left breast.

10. The method of claim 2, wherein at least one of the contrast medium-enhanced X-ray examination uses a spectral multi-energy imaging method and at least one of the iodine image, the FGT-E mask or the FGT mask is generated via at least one further image which was taken at a different energy than the at least one LE image and the HE image, the BPE result data is determined using combined images, or the contrast medium-enhanced X-ray examination is a tomographic examination.

11. A system for determining a Background Parenchymal Enhancement (BPE) in a contrast medium-enhanced X-ray examination of a breast, the system comprising:

a first data interface configured to receive images of the contrast medium-enhanced X-ray examination, the images having been taken after administration of a contrast medium, the images comprising at least one low energy (LE) image taken at a predetermined relatively low X-ray energy and high energy (HE) image which has been taken at a predetermined relatively high X-ray energy;

an iodine image unit configured to create an iodine image from the at least one LE image and the HE image;

a BPE unit configured to calculate a volumetric BPE as a sum of all pixel values in the iodine image for which iodine enrichment is present in the iodine image and fibroglandular tissue (FGT) is present and obtain BPE result data based on the iodine image and the volumetric BPE; and a second data interface configured to output the BPE result data.

12. A control facility configure to control a mammography system comprising the system of claim 11.

13. A mammography system comprising the control facility of claim 12.

14. A non-transitory computer program product comprising commands that, when executed by a computer, cause the computer to perform the method of claim 1.

15. A non-transitory computer-readable storage medium comprising commands that, when executed by a computer, cause the computer to perform the method of claim 1.

16. The method of claim 4, wherein the assignment function assigns specific designations to intervals of a continuous range of values.

17. The method of claim 16, wherein the specific designations indicate four different degrees of strength or another range of values.

18. The method of claim 6, wherein the indicator is generated by:

calculating a breast density map from the at least one LE image or a linear combination of the at least one LE image and the HE image;

comparing intensity values of image elements of the breast density map with corresponding image elements in the iodine image; and determining whether deviation values lie locally or globally outside a predefined range of values based on the comparing the intensity values of the image elements of the breast density map with the corresponding image elements in the iodine image.

19. The method of claim 7, wherein the performing the automated analysis includes at least one of, determining whether the BPE is localized or homogeneously distributed in the iodine image, wherein morphological operators are applied sequentially to the iodine image or to an FGT enrichment (FGT-E) mask, or determining the morphology and the texture of the BPE using Haralick texture functions applied to at least one of the FGT-E mask or the iodine image.

20. The method of claim 8, wherein the performing the automated longitudinal section assessment includes at least one of, calculating a relative change in volumetric BPE across the multiple X-ray examinations, or calculating a change in at least one of a spatial distribution, a morphology or a texture of the BPE.

* * * * *